JAMES W. CUMINGS.

Improvement in Ore-Crushers.

No. 126,034.

Patented April 23, 1872.

Witnesses:

Inventor
James W. Cumings.
per Alexander Mason
Atty.

126,034

UNITED STATES PATENT OFFICE.

JAMES W. CUMINGS, OF GEORGETOWN, COLORADO TERRITORY.

IMPROVEMENT IN ORE-CRUSHERS.

Specification forming part of Letters Patent No. 126,034, dated April 23, 1872; antedated April 10, 1872.

*To all whom it may concern:*

Be it known that I, JAMES W. CUMINGS, of Georgetown, in the county of Clear Creek and Territory of Colorado, have invented certain new and useful Improvements in Machines for Pulverizing Ores and other substances; and do hereby declare the following to be a full, clear, and exact description thereof, reference being had to the accompanying drawing and to the letters of reference marked thereon.

My invention is intended as an improvement on a mill known as the "Chillian quartz-mill;" and it consists, first, in adding one or more feed-pipes, one end of each of which shall be attached to a rotary-feed hopper placed over and attached to a perpendicular or upright driving-shaft, and the other end extending down immediately in front and partly under a crushing or grinding wheel, in such a manner that it travels around with the shaft, and continually distributes material to be ground directly in front of said wheel, and on the concave surface of the pan; second, in a revolving wheel furnished with brushes or scrapers set nearly at right angles with said crushing or grinding wheel, and adjusted in such a manner that it may follow said wheel around the circle, and continually sweep or scrape the pulverized material from the concave surface of the pan on to a screen, as will be hereinafter described; third, in a concavo-convex screen extending around the outside periphery of the pan, and set or adjusted to the part of a circle corresponding with the circle traveled by the rotary brush, in such a manner that it may screen the material swept on by the brush, by allowing the part which is sufficiently fine to pass through the meshes, and at the same time furnishing a sufficient incline to allow the coarse or unground portion to roll back by the force of gravity on to the concave surface of the pan to be reground.

In order to enable others skilled in the art to which my invention appertains to make and use the same, I will now proceed to describe its construction and operation, referring to the annexed drawing which forms a part of this specification, and in which—

Figure 1:
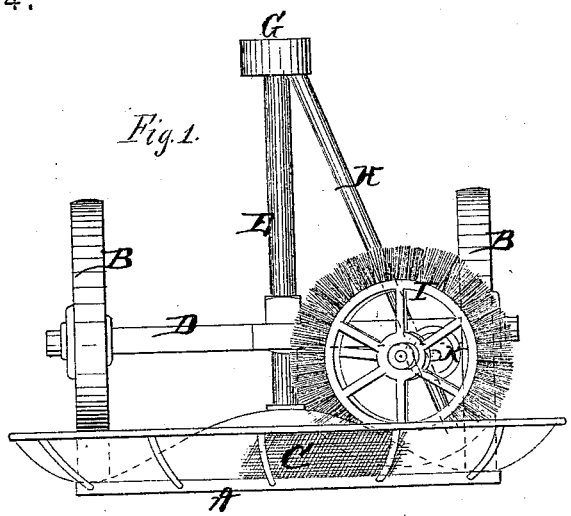
Figure 2:
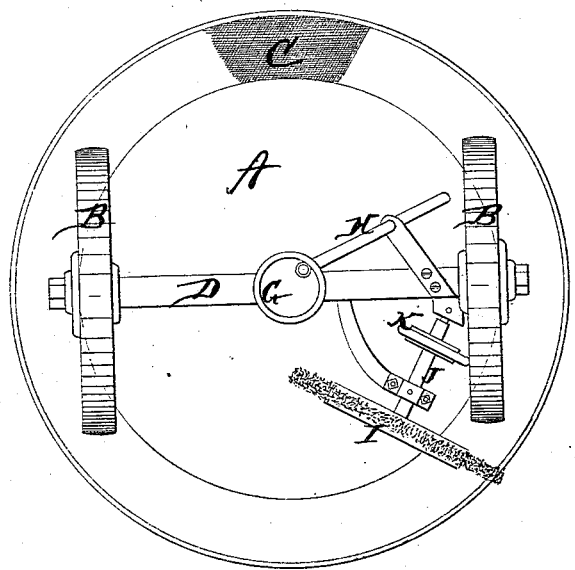

Figure 1 is a side elevation, and Fig. 2 is a plan view of a mill with my improvements attached.

A represents a circular pan, having a raised convex center, and along the outer edge it is concave, forming, as it were, a circular trough, in which the crushing-wheels B B move. Along the outer edge of the pan A is attached a concave screen, C, of suitable fineness to allow only the ore crushed sufficiently fine to pass through. This screen, though concave, is raised upward from the point of attachment to the pan, so that the coarse part of the ore coming on the same will be enabled by its gravity to fall back into the trough or track for the crushing-wheels. These wheels B B are mounted upon the ends of a horizontal axle, D, which is attached in the center in any suitable manner to an upright shaft, E, rising from the center of the pan A. On top of this shaft is placed a feed-hopper, G, which revolves with the shaft. From this hopper one or more feed-pipes, H, extend down in front and partly under the crushing or grinding wheel B. These feed-pipes being suitably braced or connected with the axle D, travel around with the same, and continually distribute material to be crushed or ground directly in front of the wheels, and on the concave surface of the pan. I represents a wheel provided with brushes or scrapers, and mounted upon a shaft, J, having its bearings in braces or arms attached to the axle D, in such a manner that the wheel I will be set nearly at right angles with the crushing-wheel, and follow said wheel around the circle. The wheel I is revolved by a friction-wheel, K, upon the shaft J, bearing against the side of the crushing-wheel, whereby said wheel I will continually sweep or scrape the pulverized material from the concave surface of the pan A to the screen C.

Having thus fully described my invention, what I claim as new, and desire to secure by Letters Patent, is—

1. The revolving feed-pipe or pipes, H, in combination with the rollers B and revolving brush I, in a mill for pulverizing ores or other substances, substantially as set forth.

2. The rotating wheel I provided with a brush or scraper, in combination with the concavo-convex screen C and crushing-rollers B, arranged to operate as and for the purposes set forth.

3. The concavo-convex screen C extending around the outside of the pan, as shown, in combination with the crushing-rollers B B, arranged to operate substantially as herein set forth.

JAMES W. CUMINGS.

Witnesses:
 EDWIN GRIBBLE,
 C. D. WILLIAMS.